US012752441B2

(12) United States Patent
Gu et al.

(10) Patent No.: US 12,752,441 B2
(45) Date of Patent: Oct. 6, 2026

(54) ROBOT WITH INTEGRATED GEARBOX AND ASSEMBLY METHOD THEREOF

(71) Applicant: ABB Schweiz AG, Baden (CH)

(72) Inventors: Hao Gu, Shanghai (CN); Jiafan Zhang, Shanghai (CN); Jibo Yang, Shanghai (CN); Kangjian Wang, Shanghai (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/624,548

(22) PCT Filed: Jul. 24, 2019

(86) PCT No.: PCT/CN2019/097391
§ 371 (c)(1),
(2) Date: Jan. 3, 2022

(87) PCT Pub. No.: WO2021/012199
PCT Pub. Date: Jan. 28, 2021

(65) Prior Publication Data
US 2022/0241990 A1 Aug. 4, 2022

(51) Int. Cl.
*B25J 17/00* (2006.01)
*B25J 9/00* (2006.01)
*B25J 9/10* (2006.01)

(52) U.S. Cl.
CPC ............. *B25J 17/00* (2013.01); *B25J 9/0012* (2013.01); *B25J 9/102* (2013.01)

(58) Field of Classification Search
CPC ...... B25J 15/0433; B25J 17/00; B25J 9/0012; B25J 17/0241; B25J 9/126
See application file for complete search history.

(56) References Cited

U.S. PATENT DOCUMENTS 4,155,478 A * 5/1979 Ogi .......................... B29C 65/42 220/678
4,840,090 A * 6/1989 Iwata ..................... B25J 9/1025 74/640

(Continued)

FOREIGN PATENT DOCUMENTS

CN 205889243 U 1/2017
CN 208971322 U 6/2019

(Continued)

OTHER PUBLICATIONS

International Search Report and Written Opinion, issued by the ISA/CN National Intellectual Property Administration, regarding corresponding patent application Serial No. PCT/CN2019/097391; dated Apr. 29, 2020; 8 pages.

*Primary Examiner* — Minnah L Seoh
*Assistant Examiner* — Gregory T Prather
(74) *Attorney, Agent, or Firm* — Whitmyer IP Group LLC

(57) ABSTRACT

Embodiments of the present disclosure provide a robot. The robot comprises a joint housing and an internal engaging member arranged on an inner surface of the joint housing; a second arm link comprising a flange; and a moving assembly at least partially arranged in the joint housing and comprising an input shaft adapted to rotate about an axis of the input shaft; and at least one intermediate member coupled to the output flange and adapted to be driven by the input shaft to rotate while engaging with the internal engaging member, to cause a relative movement between the first and second arm links. By integrating the relative static parts of the gearbox, such as the joint housing and the output flange to the robot arm links, high connection strength of connections between robot arm links can be achieved in a more cost-efficient and space-saving manner.

11 Claims, 5 Drawing Sheets

(56) References Cited

U.S. PATENT DOCUMENTS

| | | | | |
|---|---|---|---|---|
| 4,990,839 | A | 2/1991 | Schonlau | |
| 5,102,377 | A | 4/1992 | Spanski | |
| 2004/0045389 | A1* | 3/2004 | Pascoe | F16H 55/17 74/447 |
| 2005/0204850 | A1 | 9/2005 | Nihei et al. | |
| 2009/0227412 | A1 | 9/2009 | Chang | |
| 2017/0015004 | A1 | 1/2017 | Osaka et al. | |
| 2017/0201154 | A1* | 7/2017 | Brassitos | F16C 19/548 |
| 2018/0000675 | A1 | 1/2018 | Heneveld, Jr. et al. | |
| 2018/0208171 | A1* | 7/2018 | Smith | F16D 65/46 |
| 2019/0305618 | A1* | 10/2019 | Mizukoshi | H02K 7/003 |
| 2021/0268668 | A1* | 9/2021 | Beccari | B25J 19/0033 |
| 2022/0143846 | A1* | 5/2022 | Wang | B25J 9/102 |

FOREIGN PATENT DOCUMENTS

| | | | |
|---|---|---|---|
| EP | 2700481 | A1 | 2/2014 |
| EP | 3372354 | A1 | 9/2018 |

* cited by examiner

ROBOT WITH INTEGRATED GEARBOX AND ASSEMBLY METHOD THEREOF

FIELD

Embodiments of the present disclosure generally relate to a robot as well as an assembly method thereof.

BACKGROUND

A gearbox is a device that uses gears and gear trains to provide speed and torque conversions from a rotating power source to another device. A conventional planetary gearbox typically comprises one or more outer gears (i.e., planet gears) rotating about a central gear (i.e., sun gear). Typically, the planet gears are mounted on a movable arm or carrier, which itself may rotate relative to the sun gear. The planetary gearbox also incorporates the use of an outer ring gear or annulus engaging with the planet gears. Planetary gears are typically classified as simple or compound planetary gears. Simple planetary gears have one sun, one ring, one carrier, and one planet set.

Usually, as a precision component by external suppliers with different material and processing, the gearbox is separated from robot structure manufacturing, which is further connected on the robot structure in the following assembly process. Such separated gearbox and structure designs require connection interfaces and occupy space. Especially for plastic robot, stable and robust screw connection is not accessible due to the plastic material strength and creeping effect.

SUMMARY

To address or at least partially address the above and other potential problems, embodiments of the present disclosure provide a robot with a part of the gearbox integrated in robot structure.

In a first aspect, a robot is provided. The robot comprises a joint housing and an internal engaging member arranged on an inner surface of the joint housing; a second arm link comprising a flange; and a moving assembly at least partially arranged in the joint housing and comprising an input shaft adapted to rotate about an axis of the input shaft; and at least one intermediate member coupled to the output flange and adapted to be driven by the input shaft to rotate while engaging with the internal engaging member, to cause a relative movement between the first and second arm links.

With the housing integrated into one arm link and the output flange integrated into another arm link, the assembly difficulty and cost may be reduced. Furthermore, connection interface, which occupies spaces and deteriorates connection performance in plastic robot cases, can be eliminated, thereby making the connection between the arm links and joints more stable especially for plastic robots. Also, the moving assembly comprises parts, such as intermediate members that are most susceptible to damage. With this arrangement, it is more convenient to replace, repair or maintain the moving assembly.

In some embodiments, the robot further comprises at least one bearing arranged in the joint housing and around the input shaft. In this way, the assembly difficulty and cost may be further reduced.

In some embodiments, the first arm link further comprises a first arm link body; and the second arm link further comprises a second arm link body.

In some embodiments, the joint housing, the internal engaging member and the first arm link body are integrally formed. As a result, manufacturing efficiency and structural strength can be increased significantly.

In some embodiments, the joint housing and the internal engaging member are separately formed, and the joint housing comprises a cylinder with a container for the internal engaging member to be arranged therein. With this arrangement, the joint housing may be manufactured by injection molding easily, while ensuring the quality of the internal engaging member by using machining.

In some embodiments, the robot further comprises an adjusting mechanism arranged on the internal engaging member and the cylinder, and operable to squeeze the internal engaging member inwardly to reduce an inner diameter of the internal engaging member. By using the adjusting mechanism to squeeze the internal engaging member inwardly, the fit error between the internal engaging member and the moving assembly can be compensated in an efficient way. Furthermore, with the adjusting mechanism, the joint housing and the internal engaging member do not need to be too thick, which makes injection molding easier and manufacturing precision improved in the plastic robot cases.

In some embodiments, the adjusting mechanism comprises an outer tapered portion axially arranged on an outer surface of the internal engaging member; and an inner tapered portion arranged in the cylinder and surrounding the outer tapered portion. In this way, the internal engaging member can be squeezed evenly. Furthermore, the adjusting element is easily operated without disassembling the plastic gearbox.

In some embodiments, the first arm link body and the joint housing are formed separately and connected by gluing, mechanical snapping or interference fit. With this arrangement, the joint housing may be manufactured by injection molding in a further easy way. Furthermore, high accuracy can be easily achieved by separately injection molding the first arm link body and the joint housing with even thickness and small scale.

In some embodiments, the joint housing is formed separately and then the first arm link body is formed by injection molding around the joint housing. In this way, the first arm link may be formed in an easy way while improving the connection performance between the joint housing and the first arm link body.

In some embodiments, the internal engaging member comprises a plurality of cylinder pins arranged evenly in the inner surface of the joint housing. This improves the connection performance of a robot using a cycloidal gearbox as a joint, while allowing the robot to be more compact.

In some embodiments, the internal engaging member comprises a plurality of gear teeth. This improves the connection performance of a robot using a planetary gearbox as a joint.

In some embodiments, the internal engaging member comprises a frictional surface. This improves the connection performance of a robot using a friction-based planetary gearbox as a joint.

In second aspect, an assembly method of a robot is provided. The assembly method comprises providing a first arm link comprising a joint housing and an internal engaging member arranged on an inner surface of the joint housing; providing a second arm link comprising a joint flange; and at least partially arranging a moving assembly in the joint housing and the moving assembly comprising an input shaft adapted to rotate about an axis of the input shaft; and at least one intermediate member coupled to the joint flange and adapted to be driven by the input shaft to rotate while engaging with the internal engaging member, to cause a relative movement between the first and second arm links.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

In the conventional solutions, in order to achieve the required reduction ratio, robot joints typically employ a planetary gearbox, in particular a cycloidal type planetary gearbox (i.e., a cycloidal drive or a cycloidal speed reducer), as deceleration and transmission devices.

Nowadays, the development of cheap robots and small and light robots gradually becomes a development trend of the robot field. Under this trend, non-metallic robots, such as plastic robots have been developed. The use of non-metallic material such as plastic material or composite material or the like to make robots is more and more common in robot development.

Usually, as a precision component by external suppliers with different material and processing, the gearbox is typically a separated component from other robot structures, such as the base or the robot arms, which are further connected on the gearbox in the following assembly process.

Figure 1:
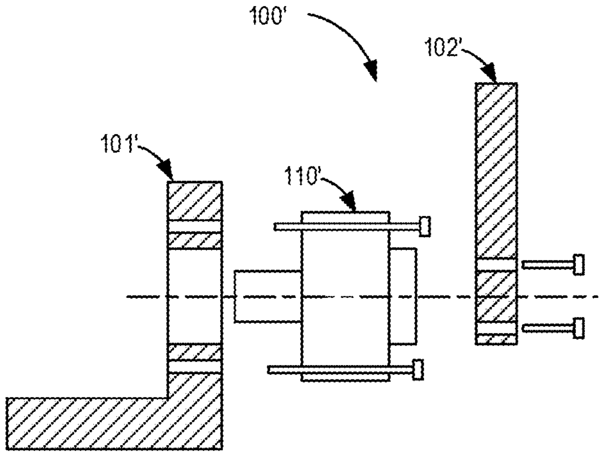
FIG. 1 (Prior Art)
FIG. 1 shows a schematic diagram of a joint portion of a traditional robot.
Figure 2:
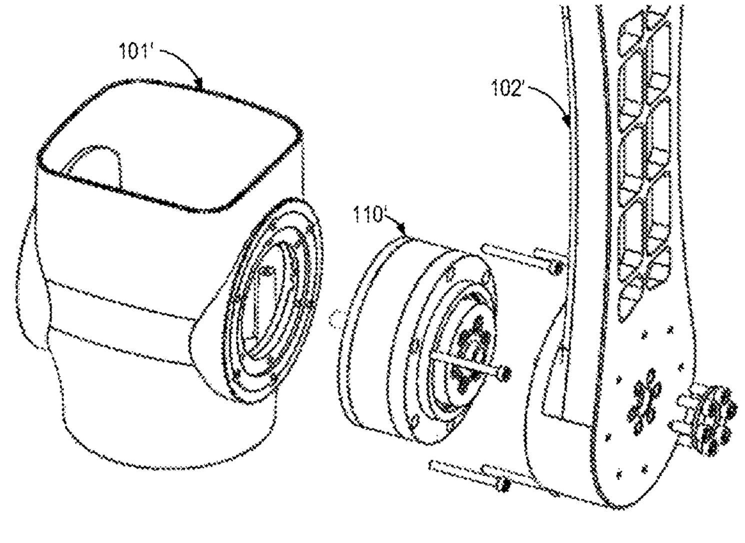
FIG.2 (Prior Art)
FIG. 2 shows a perspective view of a joint portion of a traditional robot.

FIG. 1 shows a schematic diagram of a joint portion of a traditional robot; and FIG. 2 shows a perspective view of a joint portion of a traditional robot. As shown, in the traditional robot 100', the gearbox 110' is a separated device to be connected with the robot arms 101', 102'. As a torque and rotation transmission device, the gearbox needs to be securely attached to the robot arm links, which requires the strength of the connection to be secured. For plastic robots, stable and robust screw connection is not easy to be achieved due to the plastic material strength and creeping effect, which typically requires a large enough thickness at the connection to ensure the strength of the connection.

Partial thickening of the plastic parts may make the molding process difficult and also affects the overall strength of the robot arm links. It can be seen from the above that such a separated gearbox and structure design requires connection interfaces and occupies space, which makes the robot, especially the joint portion of the robot, have a large volume. This is not desirable for today's pursuit of miniaturization and lightweight plastic robots. In addition, the gearbox, especially the moving assembly thereof is a vulnerable part as compared to robot arm links. In the event of a failure, the entire gearbox needs to be replaced, resulting in higher maintenance costs.

In order to solve or at least partly solve the above problems, embodiments of the present disclosure provide a robot. Now some example embodiments will be described with reference to FIGS. 3-8.

Figure 3:
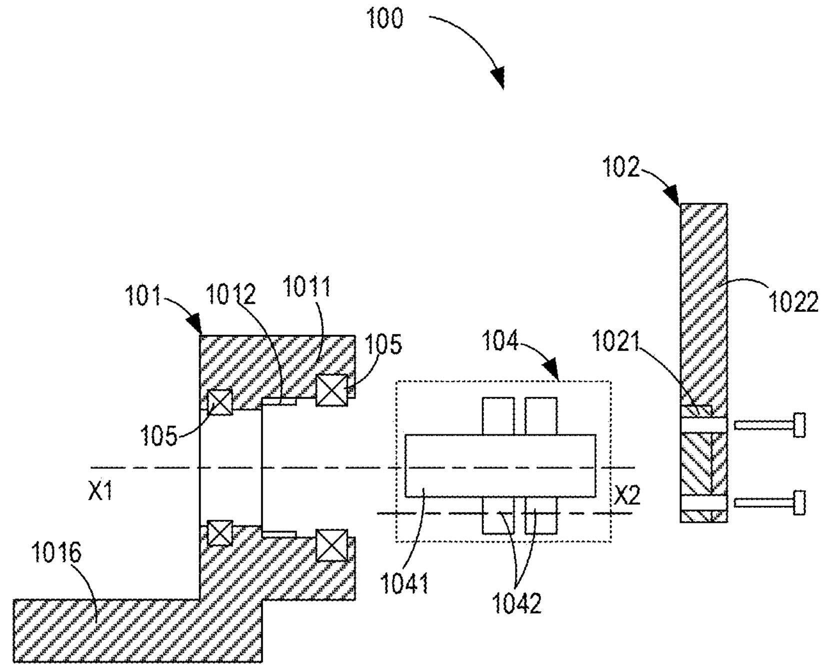
FIG. 3 shows a schematic diagram of a joint portion of a robot according to embodiments of the present disclosure.
Figure 4:
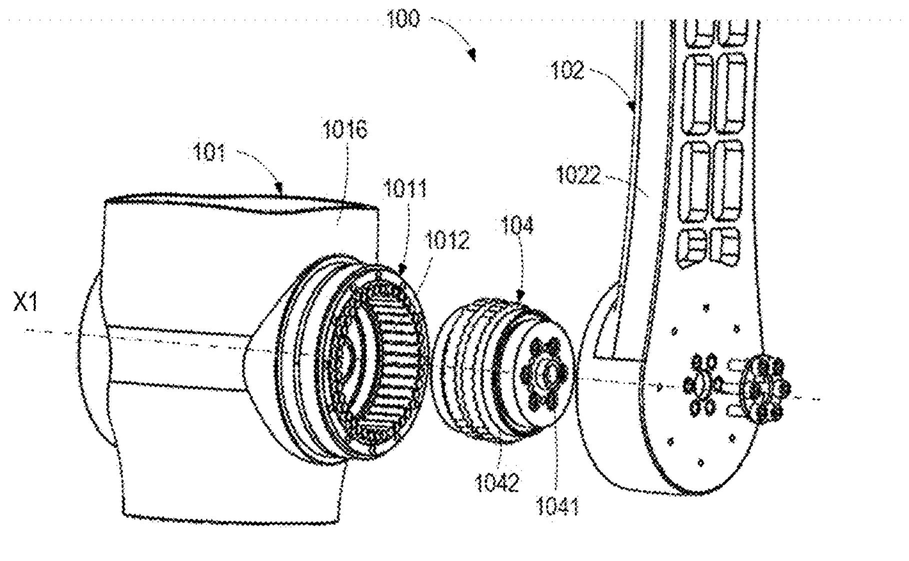
FIG. 4 shows a perspective view of a joint portion of a robot according to embodiments of the present disclosure.

FIG. 3 shows a schematic diagram of a joint portion of a robot, and FIG. 4 shows a perspective view of a joint portion of a robot according to embodiments of the present disclosure. As shown, in general, the robot comprises at least two arm links and a moving assembly 104 arranged between the arm links. The robot arm link herein represents robot arms, bases, and other structural components of a robot.

For ease of discussion, the main idea of the present disclosure will be described below by taking two robot arm links, which are referred to as a first arm link 101 and a second arm link 102 below, as an example. It is appreciated that the idea of the present disclosure can also be applied between every two robot arms of a plurality of robot arms or between the robot arms and the base of the robots.

Compared to arm links of the traditional robots, the first arm link 101 comprises a joint housing 1011 and an internal engaging member 1012 arranged on an inner surface of the joint housing 1011. The joint housing 1011 as a part of a conventional gearbox is used to receive a further part of the gearbox, i.e., the moving assembly. The second arm link 102 comprises an output flange 1021.

The moving assembly 104 as a separated unit is at least partially arranged in the joint housing. The moving assembly 104 comprises an input shaft 1041, which can rotate about its axis X when driven by a power source, such as a motor or the like. The moving assembly 104 further comprises at least one intermediate member 1042 coupled to the output flange 1021.

When the input shaft 1041 is driven to rotate about the first axis X1, the intermediate member 1042 can be driven by the input shaft 1041 to rotate about a second axis X2 while engaging with the internal engaging member 1012. In other words, the intermediate member 1042 can orbit around the first axis X1 and revolve about the second axis X2. The output flange 1021 coupled to the intermediate member 1042 thus can be actuated by the rotation of the intermediate member 1042 to rotate about the first axis X1. In this way, the first and second arm links 101, 102 can be rotated relative to each other.

It can be seen from the above that in the present disclosure, the joint housing and output flange of the traditional gearbox of a robot are parts of the first arm link 101 and the second arm link 102, respectively. The moving assembly of the traditional gearbox is pre-assembled as a separated unit to be assembled to the first and second arm links 101, 102 during a final robot assembly. That is, the housing of the conventional gearbox are separated and integrated into the robot arm links to be coupled to each other. As a result, the connection interfaces to assembly the gearbox are no longer needed. This allows the robot, especially the joint portions of the plastic robot can be made more compact, providing more freedom for a compact robot design.

By integrating the relative static parts of the gearbox, such as the joint housing 1011 and the output flange 1021 into the robot arm links, high connection strength of connections between robot arm links can be achieved in a more cost-efficient and space-saving manner. Since main parts of the housing of the conventional gearbox have been parts of the arm links, the assembly and maintenance difficulties and costs of the robots may be significantly reduced.

Moreover, as compared to the conventional solutions, the moving assembly 104, as a vulnerable part, it is only necessary to replace the damaged or worn parts in the event of damage or wear, without replacing the entire gearbox completely, which significantly reduces the maintenance cost further.

Figure 10:
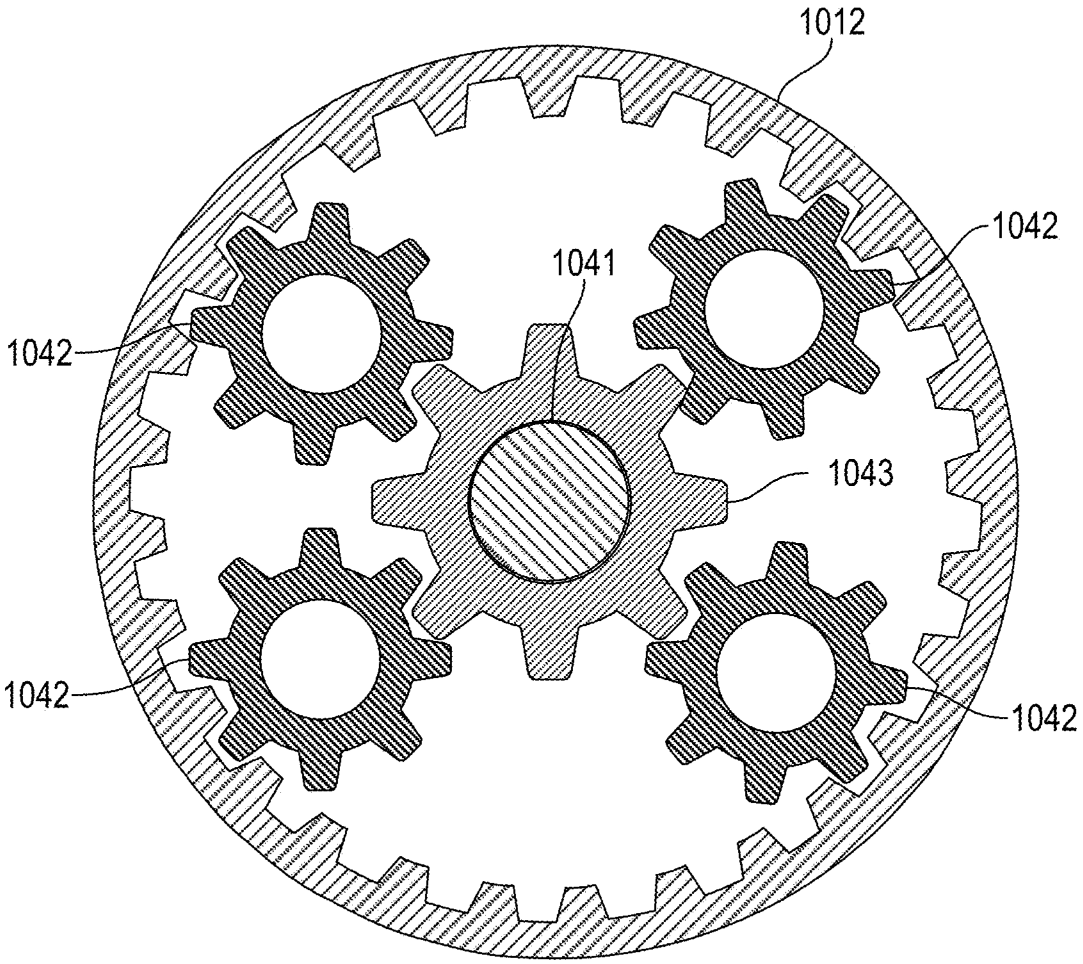
FIG. 10 shows a sectional view of a joint portion of a robot according to embodiments of the present disclosure.

In addition, it is appreciated that the above arrangements can be used in the robot that used any suitable gearboxes as the joint. For example, in some embodiments and as shown in FIG. 10, the internal engaging member 1012 may be a ring gear with internal teeth to be mounted on the inner surface of the housing 101 in any suitable ways, such as with fasteners or by interference fit. In those embodiments, the intermediate member 1042 may comprise at least one planet gear rotating about a central gear 1043.

In some alternative embodiments, the internal engaging member 1012 may comprise a plurality of cylindrical pins. In those embodiments, the input shaft 1041 may comprise at least one eccentric supporting section centered on the second axis X2 and the intermediate member 1042 may be a wheel (for example, a cycloidal wheel) arranged on the supporting section. That is, in those embodiments, the robot 100 may comprise a cycloidal type planetary gearbox.

In some further alternative embodiments, the internal engaging member 1012 may comprise a frictional surface formed in the inner surface of the joint housing 1011. In those embodiments, the input shaft 1041 may comprise at least one eccentric supporting section centered on the second axis X2 and the intermediate member 1042 may be a wheel with frictional surfaces arranged on outer surface thereof. That is, in those embodiments, the robot 100 may comprise a friction-based planetary gearbox.

That is, the idea of the present disclosure can be applied to the robot using gearboxes comprising a central gear and planet gears, cycloidal type planetary gearboxes, or even the friction-based planetary gearboxes as the joints.

For the convenience of description in the following, the part of the first arm link 101 except the joint housing 1011 will be referred to as a first arm link body 1016, and the part of the second arm link 102 except the output flange 1021 is referred to as a second arm link body 1022. The first arm link body 1016 and the second arm link body 1022 are parts that form the main shape of the first and second arms of a robot, respectively.

Figure 5:
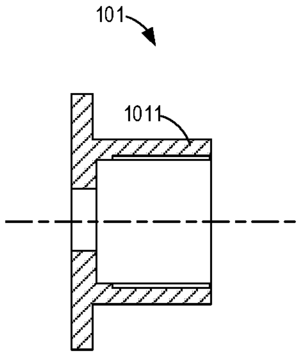
FIG. 5 shows a sectional view of a first arm link according to embodiments of the present disclosure.

In some embodiments, the joint housing 1011 and the internal engaging member 1012 or the output flange 1021 and the respective robot arm link body may be integrally formed, as shown in FIGS. 3-5. This arrangement can further reduce assembly and maintenance costs while increasing connection strength. The joint housing 1011 or the output flange 1021 may be integrally formed on the respective robot arm link by injection molding. Furthermore, in those embodiments, at least one bearing 105 may also be inserted into the inner surface of the joint housing 1011 during the injection molding process, which can further reduce the assembly and maintenance efforts.

In some embodiments, the internal engaging member 1012 may be formed on the inner surface of the joint housing 1011 by machining after the injection molding of the joint housing 1011. This can improve the accuracy of the internal engaging member 1012 to meet the high transmission requirements.

It is to be understood that the above embodiments where the joint housing 1011 and the internal engaging member 1012 or the output flange 1021 is integrated into the respective arm link body are merely for illustration, without suggesting any limitations as to the scope of the present disclosure. Any other suitable arrangements or structures are possible as well. In some alternative embodiments, each of relative static parts of the gearbox (i.e., the joint housing 1011 or the output flange 1021) and the respective robot arm link may also be separately formed and then assembled properly.

Figure 6:
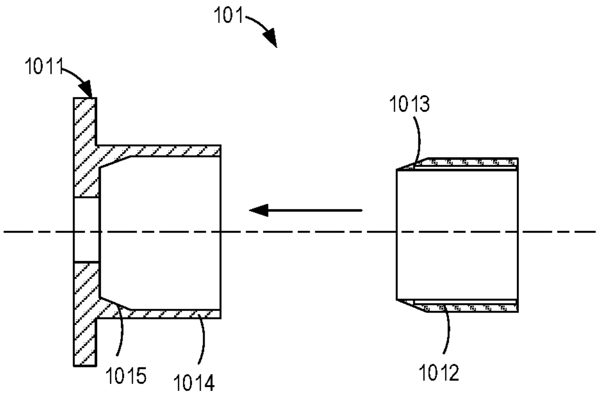
FIG. 6 shows a sectional view of a first arm link according to further embodiments of the present disclosure.

For example, in some alternative embodiments, for the first arm link 101, merely the joint housing 1011 and the first arm link body 1016 are integrally formed, and the internal engaging member 1012 and the joint housing 1011 may be separately formed by injection molding, as shown in FIG. 6. In those embodiments, the joint housing 1011 may comprise a cylinder 1014 with a container for receiving the internal engaging member 1012.

For example, in some embodiments, the container may be a plain round hole for the internal engaging member 1012 to be arranged therein by interference fit or bonding or the like. In some alternative embodiments, the container may be a hole with key grooves arranged on the inner circumference of the hole. The key grooves can receive keys formed on the outer circumference of the internal engaging member 1012 to prevent the relative movement therebetween.

With this arrangement, the components formed by injection molding all have substantially even thickness, thereby reducing the difficulty of manufacturing. Consequently, the accuracy of the component such as the internal engaging member 1012 can thus be easily improved during the injection molding process.

In some embodiments, the robot 100 may further comprise an adjusting mechanism arranged on the engaging member 1012 and the cylinder 1014. The adjusting mechanism can squeeze the internal engaging member 1012 inwardly to reduce an inner diameter of the internal engaging member 1012 while keeping the internal engaging member 1012 self-centered during the assembly. In this way, a fit error between the internal engaging member 1012 and the intermediate member 1042 can be reduced or compensated. Also, the internal engaging 1012 can be assembled in the cylinder 1014 more easily.

Furthermore, because the cylinder 104 as a part of the joint housing 1011 surrounds the internal engaging member 1012, the strength requirements of the joint housing 1011 can be met with a thinner wall of the cylinder 104 or the internal engaging member 1012. That is, the cylinder 104 or the internal engaging member 1012 which is made of plastic does not need to be too thick. As a result, the difficulty of injection molding process can be substantially reduced and manufacturing precision can be significantly improved.

The internal engaging member 1012 may be squeezed in various ways. For example, in some embodiments as shown in FIG. 6, the internal engaging member 1012 may comprise an outer tapered portion 1013, and the cylinder 1014 may comprise an inner tapered portion 1015 for surrounding the outer tapered portion 1013.

The internal engaging member 1012 can be squeezed via the outer tapered portion 1013 with the gradual insertion of the internal engaging member 1012 into the cylinder 1014. In this way, the inner diameter of the internal engaging member 1012 may be adjusted by adjusting a depth of the internal engaging member 1012 into the cylinder 1014. In addition, as mentioned above, the adjusting mechanism with the above mentioned tapered structure also enables the internal engaging member 1012 to be self-aligned in the cylinder 1014, which facilitates the assembly of the internal engaging member 1012.

In some embodiments, there are stop structures formed on the engaging member 1012 and the cylinder 1014 to prevent the relative rotation between the engaging member 1012 and the cylinder 1014. For example, the engaging member 1012 may comprise a protrusion or a key formed on an outer circumference of the engaging member 1012, and the cylinder 1014 may comprise a recess at a position of an inner circumference corresponding to the protrusion to receive the protrusion. In this way, the relative rotation between the engaging member 1012 and the cylinder 1014 can be prevented.

In some embodiments, the internal engaging member 1012 and the cylinder 1014 may be made of different materials. For example, the internal engaging member 1012 may be made with a material with a good self-lubricant and flexible performances, such as polyformaldehyde (POM). In this way, the manufactured internal engaging member 1012 with this material may be squeezed more easily. Furthermore, the cylinder 1014 may be made with a material that is stiffer, such as glass fiber reinforced plastic or metal.

Figure 7:
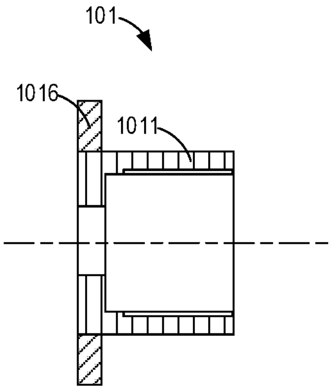
FIG. 7 shows a sectional view of a first arm link according to further embodiments of the present disclosure.
Figure 8:
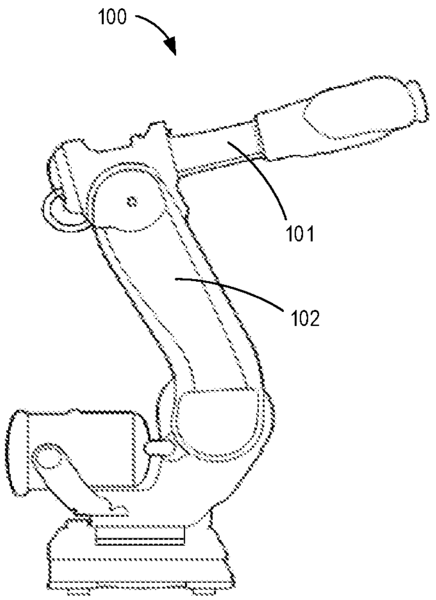
FIG. 8 shows a perspective view of a robot according to embodiments of the present disclosure.

In some embodiments, as shown in FIG. 7, the joint housing 1011 may be formed separately by casting, injection molding or the like. Then the joint housing 1011 may be integrally formed into the first arm link body 1016 by injection molding, for example, by placing the joint housing 1011 at a suitable location in the mold when the first arm link body 1016 is injection molded. This arrangement makes the manufacturing of the first arm link easier while improving the connection performance between the joint housing and the first arm link body. In some alternative embodiments, the first arm link body 1016 and the joint housing 1011 may be separately formed for example by injecting molding. This can further reduce the manufacturing difficulty and cost of the first arm link body 1016 and the joint housing 1011.

The first arm link body 1016 and the joint housing 1011 may be connected in any suitable manners after being formed by injection molding. For example, they may be connected by gluing, mechanical snapping or interference fit. Similarly to the embodiments as shown in FIG. 6, an adjusting mechanism or a self-aligned mechanism or stop structures may be provided on the first arm link body 1016 and the joint housing 1011.

It can be seen from the above the according to embodiments of the present closures, by integrating the relative static parts of the gearbox, such as the joint housing 1011 and the output flange 1021 into the robot arm links, high connection strength of connections between robot arm links can be achieved in a more cost-efficient and space-saving manner. Since main parts of the housing of the gearbox have been parts of the arm links, and the moving parts are pre-assembled as a separated unit, the assembly and maintenance difficulties and costs of the robots may be significantly reduced.

Figure 9:
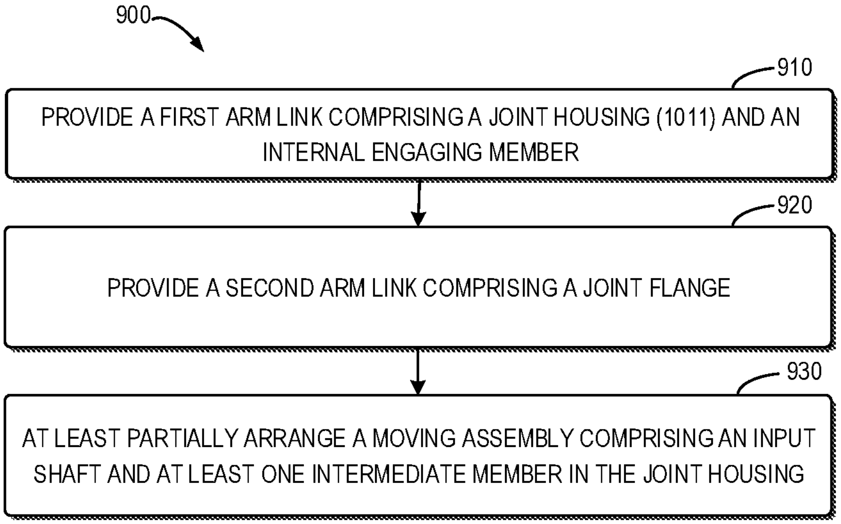
FIG. 9 shows a flowchart illustrating an assembly method of a robot according to embodiments of the present disclosure.

Embodiments of the present disclosure further provide an assembly method of the above mentioned robot 100. FIG. 9 shows a flowchart 900 illustrating an assembly method of a robot. As shown, in block 910, a first arm link 101 is provided. The first arm link 101 comprises a joint housing 1011 and an internal engaging member 1012 arranged on an inner surface of the joint housing.

In block 920, a second arm link 102 comprising an output flange 1021 is provided. After that, in block 930, a moving assembly 104 is at least partially arranged in the joint housing 1011. The moving assembly 104 comprises an input shaft 1041 and at least one intermediate member 1042. The input shaft 1041 can rotate about its axis X. The intermediate member 1042 is coupled to the output flange 1021 and can be driven by the input shaft 1041 to rotate while engaging with the internal engaging member 1012. In this way, a relative movement between the first and second arm links can be actuated. As a result, the assembly and maintenance difficulties and costs of the robots may be significantly reduced.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A robot, comprising:

a first arm link comprising:

a first arm link body, a joint housing comprising a cylinder, and an internal engaging member comprising a ring gear including internal teeth, the internal engaging member arranged on an inner surface of the cylinder of the joint housing, wherein the first arm link body is formed around the cylinder of the joint housing;

a second arm link comprising:

an output flange; and a moving assembly at least partially arranged in the joint housing and comprising:

an input shaft comprising a central gear and adapted to rotate about an axis of the input shaft; and at least one intermediate member comprising at least one planet gear engaging the central gear and the internal engaging member, each of the at least one intermediate member coupled to the output flange and adapted to rotate about a respective axis, wherein the input shaft is configured to drive the central gear to cause the at least one intermediate member engaging the central gear to orbit around the axis of the input shaft while rotating about the respective axis of each intermediate member, wherein the joint housing is a first portion of a housing of the moving assembly, and the output flange is a second portion of the housing of the moving assembly.

2. The robot of claim 1, further comprising:

at least one bearing arranged in the joint housing and around the input shaft.

3. The robot of claim 1, wherein the second arm link further comprises a second arm link body.

4. The robot of claim 3, wherein the joint housing, the internal engaging member and the first arm link body are integrally formed.

5. The robot of claim 3, wherein the joint housing and the internal engaging member are separately formed, and the cylinder comprises a container for the internal engaging member to be arranged therein.

6. The robot of claim 5, further comprising:

an adjusting mechanism arranged on the internal engaging member and the cylinder, and the adjusting mechanism is operable to squeeze the internal engaging member inwardly to reduce an inner diameter of the internal engaging member.

7. The robot of claim 6, wherein the adjusting mechanism comprises:

an outer tapered portion axially arranged on an outer surface of the internal engaging member; and an inner tapered portion arranged in the cylinder and surrounding the outer tapered portion.

8. The robot of claim 3, wherein the first arm link body and the joint housing are formed separately and connected by gluing, mechanical snapping or interference fit.

9. The robot of claim 3, wherein the joint housing is integrally formed into the first arm link body.

10. The robot of claim 1, wherein the input shaft extends between the first arm link and the second arm link.

11. An assembly method of a robot, comprising:

providing a first arm link comprising a first arm link body, a joint housing, and an internal engaging member arranged on an inner surface of the joint housing, and wherein the joint housing comprises a cylinder, and the first arm link body is formed around the joint housing, wherein the internal engaging member comprises a ring gear including a plurality of teeth;

providing a second arm link comprising an output flange; and at least partially arranging a moving assembly in the joint housing and the moving assembly comprising:

an input shaft comprising a central gear and adapted to rotate about an axis of the input shaft; and at least one intermediate member comprising at least one planet gear engaging the central gear and the internal engaging member, the at least one intermediate member coupled to the output flange and adapted to rotate about a respective axis, wherein the input shaft is configured to drive the central gear to cause the at least one intermediate member engaging the central gear to rotate about the respective axis of each intermediate member and orbit around the axis of the input shaft, wherein the joint housing is a first portion of a housing of the moving assembly, and the output flange is a second portion of the housing of the moving assembly.

* * * * *